United States Patent
Faerber

(10) Patent No.: US 7,215,962 B2
(45) Date of Patent: May 8, 2007

(54) METHOD FOR AN INTERSYSTEM CONNECTION HANDOVER

(75) Inventor: Michael Faerber, Wolfratshausen (DE)

(73) Assignee: Siemens Aktiengesellschaft, Munich (DE)

( * ) Notice: Subject to any disclaimer, the term of this patent is extended or adjusted under 35 U.S.C. 154(b) by 182 days.

(21) Appl. No.: 10/220,840

(22) PCT Filed: Mar. 6, 2001

(86) PCT No.: PCT/DE01/00843

§ 371 (c)(1),
(2), (4) Date: Sep. 6, 2002

(87) PCT Pub. No.: WO01/67784

PCT Pub. Date: Sep. 13, 2001

(65) Prior Publication Data

US 2003/0050063 A1 Mar. 13, 2003

(30) Foreign Application Priority Data

Mar. 6, 2000 (DE) ............... 100 10 958

(51) Int. Cl.
*H04Q 7/20* (2006.01)
*H04Q 7/00* (2006.01)

(52) U.S. Cl. ............... 455/437; 455/436; 370/332; 370/333

(58) Field of Classification Search ............. 455/436, 455/440, 437, 438, 442, 552.1, 553.1; 370/329, 370/331, 332, 333, 334
See application file for complete search history.

(56) References Cited

U.S. PATENT DOCUMENTS

| 5,379,446 | A | * | 1/1995 | Murase ............... 455/444 |
| 5,483,669 | A | * | 1/1996 | Barnett et al. .......... 455/437 |
| 5,697,055 | A | * | 12/1997 | Gilhousen et al. ....... 455/436 |
| 6,021,328 | A | * | 2/2000 | Curtis et al. .......... 455/443 |
| 6,185,435 | B1 | * | 2/2001 | Imura ............... 455/552.1 |
| 6,363,260 | B1 | * | 3/2002 | Achour et al. ......... 455/553.1 |
| 6,385,451 | B1 | * | 5/2002 | Kalliokulju et al. ..... 455/437 |
| 6,501,953 | B1 | * | 12/2002 | Braun et al. .......... 455/436 |
| 6,556,834 | B1 | * | 4/2003 | Kobayashi et al. ...... 455/464 |
| 6,567,670 | B1 | * | 5/2003 | Petersson ............. 455/522 |
| 6,701,149 | B1 | * | 3/2004 | Sen et al. ............ 455/436 |
| 6,804,532 | B1 | * | 10/2004 | Moon et al. .......... 455/552.1 |
| 6,845,238 | B1 | * | 1/2005 | Muller ............... 455/436 |
| 7,016,320 | B1 | * | 3/2006 | Petersson et al. ....... 370/331 |

FOREIGN PATENT DOCUMENTS

| EP | 762 791 | 3/1997 |
| GB | 2 320 658 | 6/1998 |
| WO | 97/44984 | 11/1997 |
| WO | 98/01000 | 1/1998 |
| WO | 98/014026 | 4/1998 |
| WO | 99/14972 | 3/1999 |
| WO | 99/59368 | 11/1999 |

* cited by examiner

*Primary Examiner*—Charles N. Appiah
(74) *Attorney, Agent, or Firm*—Staas & Halsey LLP

(57) ABSTRACT

Intersystem connection handover is based on transmission quality of a first radio communication system to a base station as determined by a subscriber station. If the transmission quality is lower than a threshold value, a transmission quality determination routine to a base station of the second radio communication system is triggered. The determination routine is continued until a criterion separate from the threshold is fulfilled.

20 Claims, 10 Drawing Sheets

FIG 2

Table 1: Radio subsystem connection control parameters

| Parameter name | Description | Range | Bits | Channel |
|---|---|---|---|---|
| BSIC | Base station identification code | 0-63 | 6 | SCH D/L |
| BA | BCCH assignment | - | - | BCCH D/L |
| BA_IND | Sequence number of BA | 0/1 | 1 | BCCH D/L |
| MS_TXPWR_MAX_CCH | The maximum TX transmit power which can be used by an MS in a system access before it is controlled by the other end | 0/31 | 5 | BCCH D/L |
| POWER OFFSET | The power offset is determined in conjunction with the MS TXPWR MAX CCH parameter by the class 3 DCS 1 800 MS: 0 = 0 dB 1 = 2 dB 2 = 4 dB 3 = 6 dB | 0-3 | 2 | BCCH D/L |
| RXLEV_ACCESS_MIN | Minimum required received signal level at the MS for the system access | 0-63 | 6 | BCCH D/L |
| RADIO_LINK_TIMEOUT | The maximum value of the radio link timeout 4-64 SACCH blocks, 15 steps of 4 SACCH blocks | - | 4 | BCCH D/L  SACCH D/L |
| CELL_RESELECT_HYSTERESIS | RXLEV hysteresis for required cell reselection. 0-14 dB, 2 dB steps, e.g. 0 = 0 dB, 1 = 2 dB etc. | 0-7 | 3 | BCCH D/L |
| NCC_PERMITTED | Bit map of NCCs for which the MS is allowed to report measurement results. Bit map relates to NCC part of the BSIC. | - | 8 | BCCH D/L |
| CELL_BAR_ACCESS | See Table 1a | 0/1 | 1 | BCCH D/L |
| CELL_BAR_QUALIFY | See Table 1a | 0/1 | 1 | BCCH D/L |
| CELL_RESELECT_PARAM_IND | Indicates presence of C2 Cell reselection parameter (1 = parameter present) | 0/1 | 1 | BCCH D/L |

FIG 2 (continued)

| | | | | |
|---|---|---|---|---|
| CELL_RESELECT_OFFSET | Adds an offset to the C2 cell reselection criterion<br>0 - 126 dB<br>2 dB steps, e.g.<br>0 = 0 dB, 1 = 2 dB, etc. | 0-63 | 6 | BCCH D/L |
| TEMPORARY_OFFSET | Adds a negative offset to C2 for the duration of the PENALTY_TIME.<br>0 - 60 dB, 10 dB steps, e.g. 0 = 0 dB, 1 = 10 dB etc., and 7 = infinity | 0-7 | 3 | BCCH D/L |
| PENALTY_TIME | Specifies the period for which the temporary offset is used.<br>20 to 620 s, 20 s steps, e.g. 0 = 20 s, 1 = 40 s, etc. 31 is for the note that CELL_RESELECT_OFFSET C2 is subtracted and that TEMPORARY_OFFSET is not considered. | 0-31 | 5 | BCCH D/L |

FIG 2 (continued)

| | | | | |
|---|---|---|---|---|
| LSA_OFFSET | Adds an offset for use with an LSA cell reselection between cells having the same LSA priorities.<br>0 = 0 dB, 1 = 4 dB,<br>2 = 8 dB, 3 = 16 dB,<br>4 = 24 dB, 5 = 32 dB,<br>6 = 48 dB, 7 = 64 dB | 0-7 | 3 | BCCH D/L |
| PRIO_THR | The PRIO signal strength threshold relates to RXLEV_ACCESS_MIN.<br>0 = 0 dB, 1 = 6 dB,<br>2 = 12 dB, 3 = 18 dB,<br>4 = 24 dB, 5 = 30 dB,<br>6 = 36 dB, 7 = ∞ dB | 0-7 | 3 | BCCH D/L |
| LSA ID | The LSA identities for the cell | | | BCCH D/L |
| QSEARCH | Threshold value of the received GSM signal quality, above which measurements of alternative RATs are not made | 0-7 | 3 | BCCH D/L |
| QACCEPT | Threshold value of the measured signal quality of the alternative RAT, below which a handover from GSM is unacceptable | 0-7 | 3 | BCCH D/L |

FIG 3

Table 1: Radio subsystem connection control parameters

| Parameter name | Description | Range | Bits | Channel |
|---|---|---|---|---|
| BSIC | Base station identification code | 0-63 | 6 | SCH D/L |
| BA | BCCH assignment | - | - | BCCH D/L |
| BA_IND | Sequence number of BA | 0/1 | 1 | BCCH D/L |
| MS_TXPWR_MAX_CCH | The maximum TX transmit power which can be used by an MS in a system access before it is controlled by the other end | 0/31 | 5 | BCCH D/L |
| POWER OFFSET | The power offset is determined in conjunction with the MS TXPWR MAX CCH parameter by the class 3 DCS 1 800 MS: 0 = 0 dB 1 = 2 dB 2 = 4 dB 3 = 6 dB | 0-3 | 2 | BCCH D/L |
| RXLEV_ACCESS_MIN | Minimum required received signal level at the MS for the system access | 0-63 | 6 | BCCH D/L |
| RADIO_LINK_TIMEOUT | The maximum value of the radio link timeout 4-64 SACCH blocks, 15 steps of 4 SACCH blocks | | 4 | BCCH D/L  SACCH D/L |
| CELL_RESELECT_HYSTERESIS | RXLEV hysteresis for required cell reselection. 0-14 dB, 2 dB steps, e.g. 0 = 0 dB, 1 = 2 dB etc. | 0-7 | 3 | BCCH D/L |
| NCC_PERMITTED | Bit map of NCCs for which the MS is allowed to report measurement results. Bit map relates to NCC part of the BSIC. | - | 8 | BCCH D/L |
| CELL_BAR_ACCESS | See Table 1a | 0/1 | 1 | BCCH D/L |
| CELL_BAR_QUALIFY | See Table 1a | 0/1 | 1 | BCCH D/L |
| CELL_RESELECT_PARAM_IND | Indicates presence of C2 Cell reselection parameter (1 = parameter present) | 0/1 | 1 | BCCH D/L |

FIG 3 (continued)

| CELL_RESELECT_OFFSET | Adds an offset to the C2 cell reselection criterion 0 - 126 dB 2 dB steps, e.g. 0 = 0 dB, 1 = 2 dB, etc. | 0-63 | 6 | BCCH D/L |
|---|---|---|---|---|
| TEMPORARY_OFFSET | Adds a negative offset to C2 for the duration of the PENALTY_TIME. 0 - 60 dB, 10 dB steps, e.g. 0 = 0 dB, 1 = 10 dB etc., and 7 = infinity | 0-7 | 3 | BCCH D/L |
| PENALTY_TIME | Specifies the period for which the temporary offset is used. 20 to 620 s, 20 s steps, e.g. 0 = 20 s, 1 = 40 s, etc. 31 is for the note that CELL_RESELECT_OFFSET C2 is subtracted and that TEMPORARY_OFFSET is not considered. | 0-31 | 5 | BCCH D/L |

FIG 3 (continued)

| | | | | |
|---|---|---|---|---|
| LSA_OFFSET | Adds an offset for use with an LSA cell reselection between cells having the same LSA priorities.<br>0 = 0 dB, 1 = 4 dB,<br>2 = 8 dB, 3 = 16 dB,<br>4 = 24 dB, 5 = 32 dB,<br>6 = 48 dB, 7 = 64 dB | 0-7 | 3 | BCCH D/L |
| PRIO_THR | The PRIO signal strength threshold relates to RXLEV_ACCESS_MIN.<br>0 = 0 dB, 1 = 6 dB,<br>2 = 12 dB, 3 = 18 dB,<br>4 = 24 dB, 5 = 30 dB,<br>6 = 36 dB, 7 = ∞ dB | 0-7 | 3 | BCCH D/L |
| LSA ID | The LSA identities for the cell | | | BCCH D/L |
| QSEARCH | Threshold value of the received GSM signal quality, above which measurements of alternative RATs are not made | 0-7 | 3 | BCCH D/L |
| QACCEPT | Threshold value of the measured signal quality of the alternative RAT, below which a handover from GSM is unacceptable | 0-7 | 3 | BCCH D/L |
| QSEARCH_HYST | Range of threshold values for the received GSM signal quality referred to QSEARCH, above which the measurements of alternative RATs are terminated.<br>(The range is 16 dB in steps of two dB coded by three bits) | 0-15 | 3 | BCCH D/L |

FIG 3 (continued)

| QSEARCH_TIME | Specifies the length of time with which measurements of the alternative RATs are continued after the QSEARCH criterion has been met. As long as the timer is active, a GSM quality above the QSEARCH threshold value does not lead to a discontinuation of the measurements of neighboring alternative RATs. When the timer times out and the GSM quality is above QSEARCH, the measurements of other RATs are discontinued. | [still to be defined] | [still to be defined] | BCCH D/L |
|---|---|---|---|---|

METHOD FOR AN INTERSYSTEM CONNECTION HANDOVER

CROSS REFERENCE TO RELATED APPLICATIONS

This application is based on and hereby claims priority to German Application No. 100 109 58.6 filed on 6 Mar. 2000, the contents of which are hereby incorporated by reference.

BACKGROUND OF THE INVENTION

1. Field of the Invention

The invention relates to a method for an intersystem handover. In particular, the invention is suitable for use in a mobile radio system or wireless subscriber access system.

2. Description of the Related Art

In radio communication systems (also called radio access technology—RAT—in the text which follows), for example the second-generation European mobile radio system GSM (global system for mobile communications), information such as, for example, voice, image information or other data are transmitted via a radio interface with the aid of electromagnetic waves. The radio interface relates to a connection between a base transceiver station and a multiplicity of subscriber stations, where the subscriber stations can be, for example, mobile stations or stationary radio stations. Electromagnetic waves are radiated with carrier frequencies which are located within a frequency band provided for the respective system. For future radio access technologies, for example the UMTS (universal mobile telecommunication system) or other third-generation systems, frequencies are provided in a frequency band of approx. 2000 MHz. For the third mobile radio generation UMTS, two modes are provided, one mode being an FDD (frequency division duplex) mode and the other mode being a TDD (time division duplex) mode. These modes are used in different frequency bands and both modes support a so-called CDMA (code division multiple access) subscriber separation method.

For descriptions of the second-generation mobile radio system GSM, the book by J. Biala "Mobilfunk und Intelligente Netze" (which may be translated as "Mobile radio and intelligent networks"), Vieweg Verlag, 1995 provides the basic general state of the art.

Due to the fact that the second- and third-generation radio access technologies exist in parallel and it is desired to harmonize between them, subscriber stations which have set up a connection in one radio access technology are to be provided with the possibility of handing the connection over to another radio access technology which may support a different transmission mode. This handing over between technologies is also called intersystem handover.

At the beginning of the spread of the future UMTS mobile radio system, so-called multimode subscriber stations will support both the GSM standard and the UMTS standard at the least. This is mainly of significance to operators which are implementing both, for example, a full coverage of an entire country by the GSM mobile radio system and an initially locally limited coverage by the UMTS mobile radio system.

According to the GSM standard, the subscriber station must observe, for example, the received signal strength indicators (RSSI) of up to 32 neighboring cells and the six neighboring cells offering the best transmission conditions must be periodically signaled to the base transceiver station providing coverage.

In parallel with this observation of neighboring cells of the system to which the subscriber station has set up a connection or is in a so-called idle mode, the subscriber station will also have to additionally observe radio cells of one or more radio access technologies available in parallel in future. On the one hand, this disadvantageously increases the energy consumption of the subscriber station and, on the other hand, a certain time for observing all available systems is required in each case. For this reason, it is basically logical if the subscriber station initially only observes radio cells of one system and an observation of another system is only stimulated if the transmission quality to this system drops below a certain threshold value.

For the GSM standard, it is presently proposed to expand the so-called control parameters in such a manner that two threshold values QSEARCH and QACCEPT are additionally signaled in the control parameters in the downlink. The complete list of control parameters is given in a table in FIG. 2. The proposed threshold values are emphasized in italics.

The first threshold value QSEARCH describes a lower value for the quality of a received GSM signal above which no measurements of further systems (alternate RATs) are performed. The second threshold value QACCEPT describes a lower value for the quality of the signal of the alternate RAT below which a handover to the other system is unacceptable.

FIG. 4 is used for describing how these additional parameters affect the behavior of a subscriber station. Referring to FIG. 1 described hereinafter, values determined in the subscriber station for a transmission quality are plotted against time t. The time-variant first signal sig1 is, for example, the general signaling channel BCCH (broadcast control channel) from a base transceiver station of a GSM mobile radio system, which is transmitted by the base transceiver station with an increased and constant transmit power. The time-variant second signal sig2 is, for example, a general signaling channel BCH (beacon channel) transmitted by a base station of a UMTS mobile radio system. The time variance is mainly due to a movement of the subscriber station, but a change in the traffic loading within the radio cell within which the subscriber station is located can also lead to fluctuations in the transmission quality.

According to the proposal described, the subscriber station begins to observe the second signal sig2 after the first signal drops below the first threshold value QSEARCH and ends this observation after the first threshold value QSEARCH has subsequently been exceeded etc. In this process, the consequence of dropping below the first threshold value QSEARCH and the second signal sig2 simultaneously exceeding the second threshold value QACCEPT would be, for example, that a handover to the second system is stimulated.

The consequence of this behavior is that a frequent short-time starting and stopping of the observation of the second system would occur, particularly when values of the transmission quality are close to the first threshold value. This wastes precious energy, on the one hand, and, on the other hand, the period of observation is too short for being able to draw reliable conclusions for any handover from the measurements of the transmission quality to the second system. In this context, it must be generally taken into consideration that a single measurement of a radio cell of the second system is not sufficient. Instead, a number of measurements must be performed in order to obtain a reliable result.

SUMMARY OF THE INVENTION

The invention is based on the object of specifying a method which, based on the known method, realizes a more efficient and more reliable method for handover.

The method according to the invention has the advantageous effect that, due to the additional criterion, the determination of the transmission quality to a base transceiver station of the second system is performed until there is a reliable finding about the appropriateness of a handover to the second system.

According to the invention, a time interval or a decision hysteresis is used as the criterion separate from the threshold value.

The method according to the invention described is used in a particularly advantageous manner in a radio access technology implemented as a mobile radio system or wireless subscriber access system.

Exemplary embodiments of the invention will be explained in greater detail with reference to the attached drawings, in which:

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 2 is a table with known control parameters,

FIG. 3 is a table according to FIG. 2 containing additional control parameters according to the invention.

DETAILED DESCRIPTION OF THE PREFERRED EMBODIMENT

Figure 1:
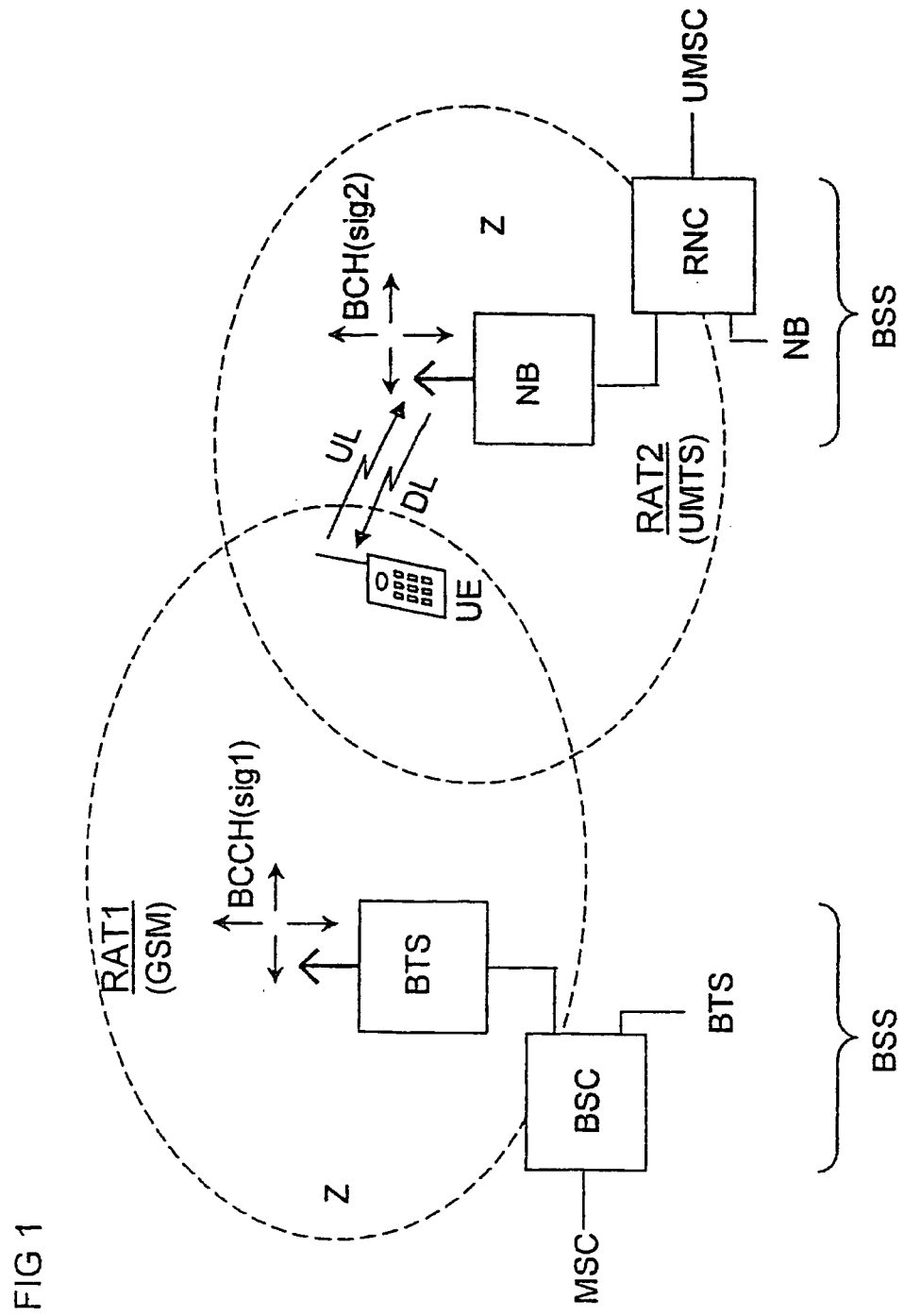
FIG. 1 is a block diagram of two neighboring radio access technologies.
Figure 4:
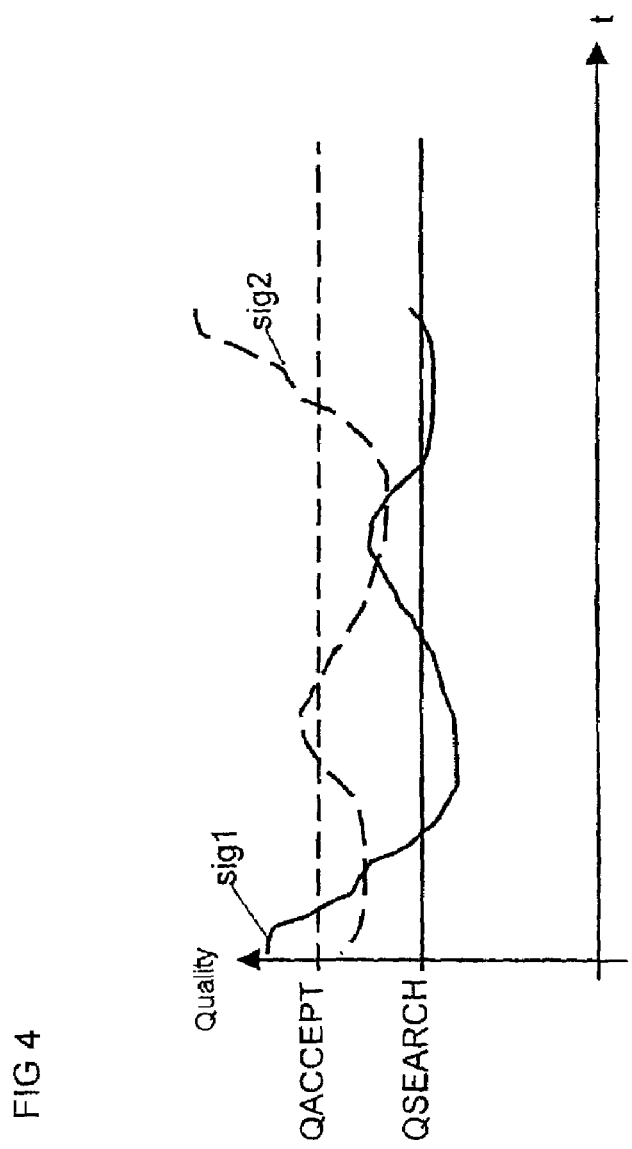
FIG. 4 is an exemplary timing diagram for the method according to the prior art.
Figure 5:
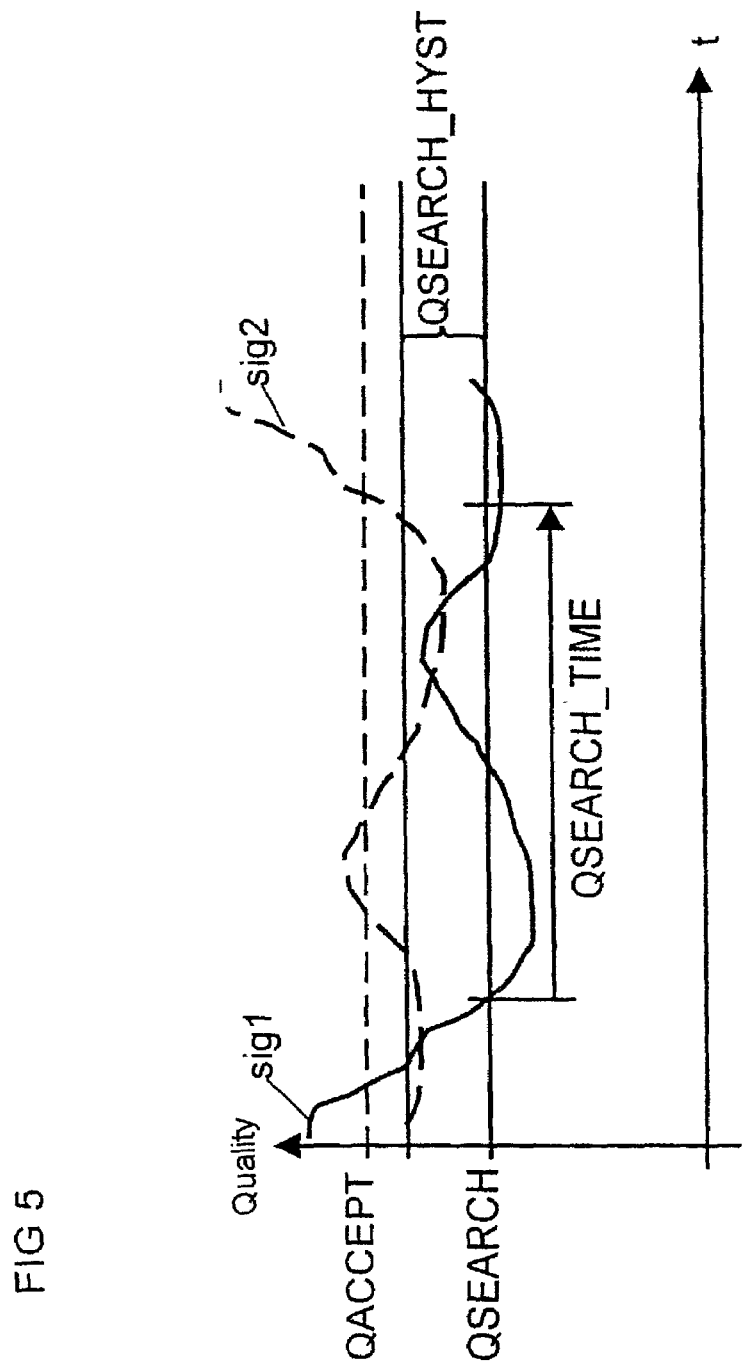
FIG. 5 is an exemplary timing diagram for the method according to the invention.

Reference will now be made in detail to the preferred embodiments of the present invention, examples of which are illustrated in the accompanying drawings, wherein like reference numerals refer to like elements throughout.

FIG. 1 shows in each case sections from two mobile radio systems RAT1, RAT2 as examples of radio access technologies. A mobile radio system typically consists of a multiplicity of mobile switching centers MSC or UMSC (mobile switching center or UMTS mobile switching center), respectively, which belong to a switching subsystem (SSS) and are networked together or, respectively, establish access to a landline network, and of in each case one or more base station subsystems (BSS) connected to these mobile switching centers MSC, UMSC. A base station subsystem BSS, in turn, exhibits at least one BSC (base station controller) or RNC (radio network controller) facility for assigning radio engineering resources and at least one base transceiver station BTS or NB (node B), connected thereto. A base transceiver station BTS, NB can set up connections to subscriber stations UE (user equipment) such as, e.g. mobile stations or other mobile and stationary terminals via a radio interface. Each base transceiver station BTS, NB forms at least one radio cell Z. As a rule, the size of the radio cell is determined by the range of a general signaling channel BCH (beacon channel) or BCCH (broadcast control channel) which is transmitted by the base transceiver stations BTS, NB with a transmitting power which is in each case higher than the traffic channels. In the case of sectorization or of hierarchical cell structures, it is also possible for each base transceiver station BTS, NB to cover a number of radio cells. The functions of this structure can be transferred to other radio access technologies in which the invention can be used, particularly for subscriber access networks with wireless subscriber access.

The example of FIG. 1 shows a subscriber station UE which is constructed as a mobile station and which is located in a radio cell Z of the first mobile radio system RAT1 which supports a GSM standard, and in a radio cell Z of a second mobile radio system RAT2 which supports a UMTS standard. The subscriber station UE has set up a connection to the base transceiver station BTS, shown by way of example, of the first mobile radio system RAT1. During the call, the subscriber station UE periodically evaluates transmission conditions of the radio interface to surrounding base transceiver stations such as, for example, the specified base transceiver station NB of the first mobile radio system RAT1, for example, in the case of a deterioration of the transmission quality to the base transceiver station BTS of the second mobile radio system RAT2 or in the case of the additional setting-up of a service, in order to stimulate a handover to the base transceiver station NB of the first mobile radio system RAT1.

If the transmission quality to the first mobile radio system RAT1 becomes generally poorer, for example due to the fact that the subscriber station UE is moving away from the radio coverage area of the first mobile radio system RAT1, an additional described observation of radio cells of a parallel mobile radio system must be stimulated in order to perform a handover to this system, if necessary.

The same method is also used, for example, in the case of hierarchical network structures when a connection between different hierarchical levels, for example from a microcell into a macrocell which operate in a different frequency band in each case, is handed over.

The method according to the invention can also be extended to a handover between radio access technologies utilizing the same transmission method. This can occur, for example, in the case of a handover between a GSM 900 system and a GSM 1800 system of one or two operators.

FIG. 3 shows, by way of example, a table according to FIG. 2, containing additional control parameters according to the invention (in italics). These parameters are, on the one hand, a hysteresis QSEARCH_HYST and, on the other hand, a time interval QSEARCH_TIME. Each of these parameters by itself already solves the problem of the prior art as described. Combining the two parameters, however, very advantageously provides for very high flexibility for the operator due to the fact that the parameters can be individually adapted.

The hysteresis QSEARCH_HYST defines a virtually additional threshold value above the threshold value QSEARCH as can be seen from FIG. 2. The width of the hysteresis QSEARCH_HYST can be selected by the operator, for example, individually for a radio cell and in dependence on environmental conditions.

If the quality of the first signal sig1 drops below the threshold value QSEARCH, the subscriber station UE begins to observe the quality of the second signal sig2. The observation is continued until the quality of the first signal sig1 exceeds the upper limit of the hysteresis band.

The time interval QSEARCH_TIME defines a period within which the subscriber station UE determines at least the quality of the second signal sig2. In combination with the hysteresis QSEARCH_HYST, the time interval QSEARCH_TIME is only interrupted if the first signal sig1 exceeds the upper limit of the hysteresis band.

The time interval can be individually adapted but it should be ensured in every case that it at least provides sufficient time for determining a reliable value with respect to the transmission quality. The values found are advantageously averaged over the time interval and the averaged value is compared with the threshold value QSEARCH.

The invention has been described in detail with particular reference to preferred embodiments thereof and examples, but it will be understood that variations and modifications can be effected within the spirit and scope of the invention.

The invention claimed is:

1. A method for controlling an intersystem handover from a first radio access technology using a first transmission method to a second radio access technology using a second transmission method, comprising:
   comparing a threshold value to a first transmission quality of a first signal to a first base transceiver station of the first radio access technology with respect to at least one first transmission characteristic, determined by a subscriber station; and
   only after the first transmission quality drops below the threshold value, determining, by the subscriber station throughout a predetermined time interval, a second transmission quality of a second signal to a second base transceiver station of the second radio access technology with respect to at least one second transmission characteristic.

2. The method as claimed in claim 1, wherein at least one of the first and second transmission characteristics includes at least one of a received signal strength indicator, a signal/noise ratio and a bit error rate.

3. The method as claimed in claim 1, further comprising:
   after the predetermined time interval has elapsed, repeating said comparing of the first transmission quality with the threshold value; and
   ending said determining of the second transmission characteristic if the first transmission quality exceeds the threshold value.

4. The method as claimed in claim 1, further comprising:
   after the predetermined time interval has elapsed, repeating said comparing of the first transmission quality with the threshold value; and
   initiating handover to the second base transceiver station if the first transmission quality drops below the threshold value.

5. The method as claimed in claim 1,
   further comprising:
   determining values related to the first transmission quality during the pre-determined time interval; and
   averaging the values related to the first transmission quality to obtain an averaged value representing the first transmission quality, and
   wherein said comparing after the predetermined time interval has elapsed compares the averaged value with the threshold value.

6. The method as claimed in claim 5, wherein the predetermined time interval is selected for at least one of an individual radio cell and in dependence on a current traffic load.

7. The method as claimed in claim 6, wherein a hysteresis depending on the threshold value is used as the criterion.

8. The method as claimed in claim 7, wherein said determining of the second transmission quality is continued until the first transmission quality is outside a range limited by the hysteresis.

9. The method as claimed in claim 8, wherein the range of the hysteresis can be selected for an individual radio cell.

10. The method as claimed in claim 9, wherein the first radio access technology supports a GSM transmission method and the second radio access technology supports a UMTS transmission method.

11. The method as claimed in claim 1, further comprising upon completion of the predetermined time interval, deciding by the subscriber station whether to communicate with the first base transceiver station of the first radio access technology or the second base transceiver station of the second radio access technology.

12. A subscriber station for carrying out a method for controlling an intersystem handover from a first radio access technology using a first transmission method to a second radio access technology using a second transmission method, comprising:
   a processor programmed to determine a first transmission quality of a first signal to a first base transceiver station of the first radio access technology with respect to at least one first transmission characteristic, to compare the first transmission quality to a threshold value and, only after the first transmission quality drops below the threshold value, to determine, throughout a predetermined time interval, a second transmission quality of a second signal to a second base transceiver station of the second radio access technology with respect to at least one second transmission characteristic, until a criterion separate from the threshold value is met.

13. The subscriber station as claimed in claim 12, wherein at least one of the first and second transmission characteristics includes at least one of a received signal strength indicator, a signal/noise ratio and a bit error rate.

14. The subscriber station as claimed in claim 12, wherein said processor is further programmed to repeat comparison of the first transmission quality with the threshold value after the predetermined time interval has elapsed and to end determination of the second transmission characteristic if the first transmission quality exceeds the threshold value.

15. The subscriber station as claimed in claim 12, wherein said processor is further programmed to repeat comparison of the first transmission quality with the threshold value after the predetermined time interval has elapsed and to initiate handover to the second base transceiver station if the first transmission quality drops below the threshold value.

16. The subscriber station as claimed in claim 15, wherein said processor is further programmed to determine values related to the first transmission quality during the predetermined time interval and to average the values related to the first transmission quality to obtain an averaged value representing the first transmission quality, and after the time interval has elapsed the averaged value is compared to the threshold value.

17. The subscriber station as claimed in claim 16, wherein said processor is further programmed to select the predetermined time interval for at least one of an individual radio cell and in dependence on a current traffic load.

18. The subscriber station as claimed in claim 12, wherein a hysteresis depending on the threshold value is used as the criterion.

19. The subscriber station as claimed in claim 18, wherein said processor is further programmed to continue determination the second transmission quality until the first transmission quality is outside a range limited by the hysteresis.

20. A base station subsystem of one of a mobile radio system and a wireless subscriber access system using a first transmission method implementing a first radio access technology, for carrying out an intersystem handover to another base station subsystem using a second transmission method implementing a second radio access technology, comprising:

a processor programmed to determine a first transmission quality of a first signal to said base station subsystem with respect to at least one first transmission characteristic and, only after the first transmission quality drops below a threshold value, to determine, throughout a predetermined time interval, a second transmission quality of a second signal to the other base station subsystem with respect to at least one second transmission characteristic, until a criterion separate from the threshold value is met.

* * * * *